Jan. 17, 1961 A. TONKIN 2,968,261
PIE CRUST AND OTHER DOUGH STOCK TEMPLETS
Filed Jan. 24, 1958

INVENTOR
ALBERT TONKIN
BY Philip M. Stutrud
ATTORNEY

2,968,261
PIE CRUST AND OTHER DOUGH STOCK TEMPLETS

Albert Tonkin, 1709 Hamline Ave. N., St. Paul, Minn.

Filed Jan. 24, 1958, Ser. No. 710,941

3 Claims. (Cl. 107—46)

This invention relates to improvements in pie crust and other dough stock templets, and particularly to such as will eliminate adhesional contact without the use of pastry cloths and releasable bands, and will save time and minimize the amount of flour and rolling required for the operation.

There has been considerable work in this field, to devise apparatus, to accomplish these purposes. Such apparatus has included pastry cloths and releasable bands, or required the use of a great deal of flour and rolling.

It is apparent that there is need for a pie crust and other dough stock templet, that is self eliminating of adhesional contact, without any trouble or fuss. In other words, to be performed without active thought or any further ado on the part of the operator. It is essential that this device be economically manufactured, particularly for household use. In addition to pie crusts, it may also be employed for sheets of dough for other pastries and baked goods. Housewives have difficulty in making pie crust stock of full circle and proper diameter, as well as thickness, and also use a great deal of flour to prevent adhesion, which requires an excessive amount of rolling. Too much rolling and combining a large amount of flour makes the crust heavy and tough; while pie crust produced by little rolling and requiring little flour during the operation, results in a light, tender and flaky product and without waste of flour. There is need for such a device and particularly one which will release the dough stock from it, without any special skill on the part of the operator. Such a device will also fill a great need in commercial bakeries, where the stock can be produced in quantity by unskilled operators and then used as required. It can be stacked with waxed paper separators between, or a small amount of flour can then effectually be used for separation in stacking. Besides being made available in size for standard pie tins, it can of course be made to suit different sized and shaped tins for pie and other purposes. It is not limited to circular shape, which however is the most common.

An important object of my invention is to provide a pie crust and other dough stock templet, which merely by the operation of rolling out the dough and release of pressure, will by itself break adhesional contact between the dough and the surface of the templet, so that the dough will not stick but is easily removed.

Another important object is to provide a pie crust and other dough stock templet, so that the stock can be easily produced without guess work as to size and shape to fit the tin and of proper uniform thickness, and it may also provide markings, so the pastry can be divided into substantially symmetrical and equal parts.

Another important object is to provide a pie crust and other dough stock templet, which is very sanitary, with no crevices or cloth to collect germs, and which may be washed in a dish pan after each use by the housewife or at intervals, if in commercial use.

Another important object is to provide a pie crust and other dough stock templet, which is relatively plain but very serviceable and can be manufactured at reasonable cost.

Other objects will be apparent from the description and appended claims.

For a full disclosure of my invention, reference is made to the description following and to the drawings, wherein like characters denote corresponding parts in the several views, and in which—

Figure 1:
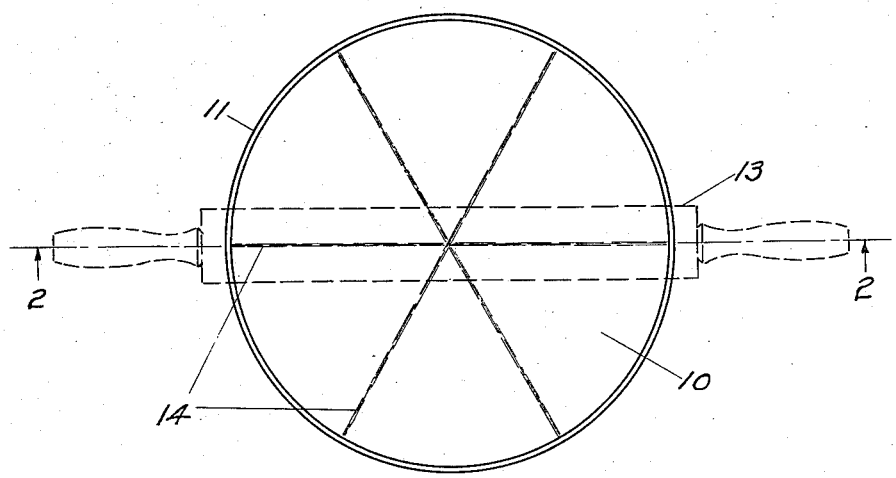
Fig. 1 is a top plan view of a pie crust stock templet or doughrolling device according to this invention, with a rolling pin indicated in dotted outline.
Figure 2:
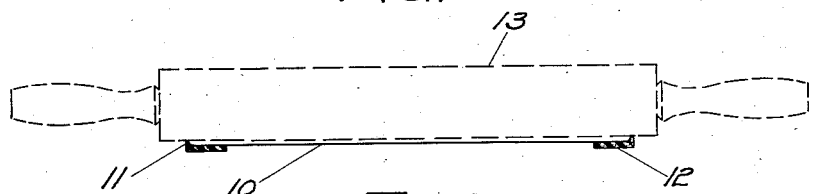
Fig. 2 is a longitudinal sectional view on the line 2—2 of Fig. 1.
Figure 3:
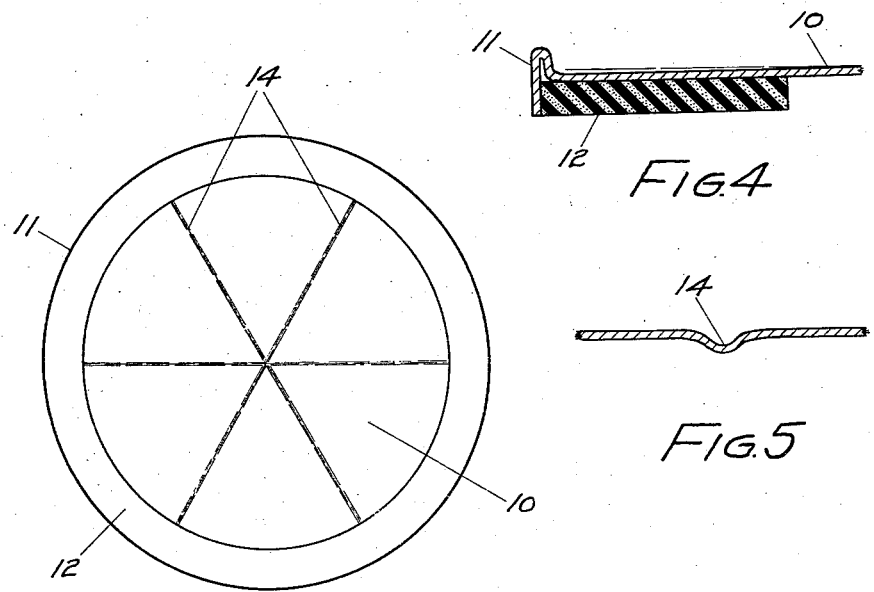
Fig. 3 is a bottom plan view of the same structure.
Figure 4:
Fig. 4 is an enlarged fragmentary section through the rim of the structure.
Figure 5:
Fig. 5 is an enlarged fragmentary section of means for producing markings in the disk of dough.

Referring to the drawings, the reference character 10 indicates the main member, with a marginal rim 11 to define a dough-occupying area, a base member 12 of skid resisting material, a rolling pin 13 and optionally radial ribs or grooves 14 comprising means for delineating the size and shape of pie cuts. The rolling pin, indicated in dotted outline, may be any conventional rolling pin of sufficient length. The main member 10, it will be noted, is convex or arched upwardly, forming a mold with slight upward convex curvature extending across same. This mold is provided with a smooth top surface and the arching is only sufficient in amount and resistance, so that when depressed in action and released, it will break adhesion with the dough and permit the disk of dough to be easily removed. The member 10 may be made of any rather rigid, yet slightly yieldable flat material, of sufficient resiliency, like metal, plastic, fiber or wood. In metal, stainless steel or aluminum steel alloy are excellent materials, while others, like tin plated sheet steel may also be satisfactory, and preferably formed by dies. It may be cast in plastic, formed in fiber or turned in wood. The rim 11 gages the thickness of the pie crust stock, as it is rolled out by the rolling pin, during the normal movements thereof, the excess if any being trimmed off by the rim 11. This rim, constituting a self-acting marginal cutting edge, is slightly less than ⅛ inch in height for customary pie crust. It is provided with a slight draft angle, as shown by section of Fig. 4, and makes for ready release of the disk of dough, as it breaks adhesional contact with the mold. By experience, the proper amount of dough is gaged, so that the amount of dough trimmed is minimized and almost nil. When the dough is rolled out to proper size and thickness by the rolling pin and the action of the rolling pin is removed, the member 10 flexes and reacts upward, so that the disk of dough recedes slightly toward the middle, breaking adhesional contact. The device is thus self-eliminating of adhesional contact, and this is accomplished without or with a very light sprinkling of flour on the templet. The operation is accomplished, with a small amount of rolling and the use of a small amount of flour, which combined, results in a light, tender and flaky pie crust. There is no need for an unsanitary pastry cloth to transfer the disk of dough, and forgetfulness and carelessness, in dusting templet with flour, is of no consequence. Slight downward grooves 14 form markings in the disk of dough, for cutting pieces of the finished pie of proper equal size and shape. These grooves may be formed upward in the templet rather than downward, but this would result in some thinning of the crust, so the former seems preferable. Ordinarily, the markings would provide for six or eight divisions or pieces of pie, which however can be varied to suit. The grooves, formed by the markings, act as ribs, giving strength, even though formed of a light gage material. Decorative designs and advertising imprints may also be added in the templet. The base member 12 comprises a ring of skid resisting material, secured preferably with adhesive to the underside of the member 10. This may be provided in embossed neoprene, and if the templet is made of plastic, grids may be cast integral with the main member. The base member 12 keeps the device in fixed position on top of a table or bench, while in use. Instead of a full ring, sections of a ring or pads near the periphery of the member 10, may be employed. Conventional suction cups may also be used for the purpose, arranged around the edge, so as not to interfere with the flexing of the member 10.

In the use of the device, it is evident that it takes the "guess" out of pie crust making, so that uniform size and thickness are obtained, with great facility with never any need for patching. Further, by the adhesion having been broken by the templet or mold with slight upward convex curvature extending across same, the disk of dough is readily handled for transfer from the device. The pie plate may be laid on top of the rolled dough and the device turned over, thus transferring the dough to the plate. The templet is made of a size, to provide a disk of dough to fit a standard pie plate or any other size decided upon, so that the dough will fit into and up the inclined sides and onto the rim of the pie plate. For the top of the pie, another disk of dough is similarly formed and placed over the filled pie. Since this will extend somewhat over the periphery of the pie plate, the surplus may be trimmed off with a knife, or better yet tucked under, thereby more fully retaining the flavor of the pie. In the case of open top pies, like custard and pumpkin, markings for cutting the pieces, are still available in the portion of the dough around the rim of the pie plate.

On a commercial production line basis, as in cafeterias, lunch rooms, hotels and bakeries, much time can be saved and a better quality pie crust obtained, and for which no special skill is required in manipulation of the device. The circular rim provides a pattern for guidance in rolling out the dough in various directions, so as to work it into a circular disk form; and the rolling pin riding on the rim, so defined, rolls the dough to a substantially uniform thickness, and any surplus is trimmed off by the rim, as the rolling pin rides thereon. When relieved from pressure of the rolling pin, the finished dough stock draws back from the edge and is easily peeled off the templet and picked up by hand, or released by tipping upside down. In such commercial production, the stock can be prepared for use later, by stacking up the stock with pieces of wax paper between for separators, or flour may then effectively be used for separation in stacking. With the dough of substantially even thickness, the resulting pies will present a neater appearance, because of the all around uniformity of crust. In commercial production, markings to identify the product or ornamentation may be desired, all of which can be formed in the templet. It is obvious that the device is not limited to pie crust stock, but will lend itself admirably to many other products from dough and similar mixtures.

While I have shown and described a preferred form of my invention, it is obvious that many changes, which are within the scope of my invention, will be apparent to those skilled in the art. I therefore desired to be limited only by the scope of the appended claims.

What I claim is:

1. A dough rolling and trimming templet, comprising a one piece, resilient, sheet material bottom member of a pre-selected shape and area, having an upstanding surrounding rim secured thereto along the outer edges thereof, said rim having a height equal to the desired thickness of the finished dough form to be rolled out in the enclosed space of said templet, and whereby dough in excess thereof will be severed by the rolling action of the rolling pin over said rim, said bottom member being uniformly thick throughout its extent and having a slight convex contour coextensive with its upper or dough contacting surface so as to provide a downwardly facing coextensive concave surface, whereupon when dough is rolled out upon said templet, said bottom member will be pressed downwardly by the pressure of the rolling pin on the dough and will spring upwardly with the removal of the rolling pin to thereby release the bond between the dough piece and the upper surface of the templet.

2. A structure as specified in claim 1 wherein said bottom member is provided with radially disposed upwardly facing grooves, adapted to provide radial ridge-like markings on the finished dough form to serve as cutting guides after the dough product has been baked for the purpose of dividing the product into the portions designated by the markings.

3. A structure as specified in claim 1 wherein said bottom member is provided with skid resisting material on its under side near its periphery, arranged in predetermined amount, for the purpose of keeping templet in fixed position, while in use.

References Cited in the file of this patent

UNITED STATES PATENTS

| | | |
|---|---|---|
| 476,340 | Wagant | June 7, 1892 |
| 2,355,307 | Kors | Aug. 8, 1944 |

FOREIGN PATENTS

| | | |
|---|---|---|
| 287,265 | Great Britain | Mar. 22, 1928 |

OTHER REFERENCES

"Rubber Vacuum Cups Keep Pastry Board in Place," page 90, August 1938, Popular Science Monthly.